United States Patent Office 3,441,436
Patented Apr. 29, 1969

3,441,436
TOOL QUALIFICATION FILM COMPRISING A WOVEN FABRIC COATED WITH A RESINOUS MIXTURE FOR USE IN DETERMINING THE EFFECTIVENESS OF TOOLS
Regis Raab, Havre de Grace, Md., assignor to American Cyanamid Company, Stamford, Conn., a corporation of Maine
No Drawing. Filed Feb. 9, 1966, Ser. No. 526,054
Int. Cl. C09d 3/48; B32b 17/00
U.S. Cl. 117—161                                7 Claims

ABSTRACT OF THE DISCLOSURE

A tool qualification film comprising a woven fabric coated with a resinous mixture of certain polyvinyl acetal-alcohol-acetate resins, polyglycol diepoxides, liquid polyhydric alcohols and 2-ethyl-4-methylimidazole.

---

This invention relates to a tool qualification film comprising a woven fabric coated with a mixture of a polyvinyl acetal-alcohol-acetate resin, a polyglycol diepoxide, a liquid polyhydric alcohol and, as a coating catalyst for the diepoxide, catalytic quantities of 2-ethyl-4-methyl imidazole. Still further, this invention relates to a tool qualification film comprising a woven fabric coated with a mixture of a polyvinyl acetal-alcohol-acetate resin, a polyglycol diepoxide, a liquid polyhydric alcohol, a chlorinated polyphenyl and catalytic quantities of 4-ethyl-4-methyl imidazole.

In the aircraft industry before a bonded assembly can be produced, it is necessary that a form or mold be made which is the instrument for holding the assembled parts plus adhesive together and is the means by which heat and pressure is applied to the assembly. This form or mold is known in the trade as a tool or bonding fixture. When a new tool or bonding fixture is made, it must be checked out or qualified before it can be released to the shop for production of bonded assemblies. The present method of qualifying a tool is to bond an actual part in the tool and then destructively disassemble the bonded part to determine if the tool has functioned properly in the application of heat and pressure to the assembly. This destructive disassembly of bonded parts in tool qualification is repeated, if necessary, until the tool after reworking performs satisfactorily, and from time to time during the life of the tool depending on circumstances. This manner of tool qualification can run into hundreds of thousands of dollars per year for large aircraft companies, since a given bonded assembly can cost as much as $3,000. It is, therefore, an object of this invention to eliminate the destructive disassembling of a part for tool qualification. The tool qualification films of the present invention function in all respects like structural adhesives with the exception that they have essentially zero adhesion to metal and other materials and allow such an assembly when "bonded" with these materials to be disassembled without destroying the individual components. An examination of the film after having gone through a "bonding" cycle reveals by visual observation and thickness measurements whether or not the tool has performed satisfactorily in the application of heat and pressure. The disassembled components can be used over and over again, if necessary, for further tool checking or may be used in an actual bonded structure using a structural adhesive. This object and other objects of the present invention will be discussed in greater detail hereinbelow.

Reference is made to the article entitled "Selecting Adhesives for Structural Metal Bonding," by H. R. Merriman in the Adhesives Age publication for August of 1964. This publication describes in significant detail the application of adhesives in aerospace and electronics where many varieties of metals are being bonded together.

The tool qualification films of the present invention are prepared by coating a woven fabric with a mixture of a polyvinyl acetal-alcohol-acetate resin, a polyglycol diepoxide and a liquid polyhydric alcohol catalyzed with 2-ethyl-4-methyl imidazole dissolved or dispersed in a suitable solvent. For certain applications, it is sometimes desirable to make use of a chlorinated polyphenyl.

The type of fabric which is used as the carrier medium can best be described as an open weave type of fabric wherein the individual fibers may be any one of a plurality of available natural or synthetic fibers commercially available in the industry. One may, for instance, make use of cotton fabric, linen fabric, and fabrics woven from such synthetic fibers as polyacrylonitrile fibers, polyester fibers, nylon fibers and the like. The preferred woven fabric is that prepared from fibers of glass. These loosely woven fabrics of the various fibers are available commercially from a plurality of sources.

In applying the resinous mixture to the fabric, the solution of the resinous materials is first accomplished by dissolving all of the resinous materials simultaneously in a selected solvent or successively therein. Suitable solvents used for this purpose are such materials as ethylene dichloride or other chlorinated hydrocarbons and 60/40 toluene-ethanol mixtures. The amounts of the resinous mixture incorporated into the solvent may be varied over a very substantial range so as to provide a total resinous solids varying between about 30% and about 60% by weight. The solution of the resinous solids is coated on the woven fabric using conventional coating and drying equipment. The coating speed and drying temperatures depend in significant measure on the particular coating facilities used and the final weight of film desired. As a typical illustration, the coating speed may be about 9.5"/min. and the drying temperature selected in view of the particular solvent used is in the range of 120–140° F. For instance, when ethylene dichloride is the solvent under these conditions, dwell time in the drying chamber at the above stated temperature range is approximately one hour. The ultimate woven fabric, then substantially free of solvent, will contain about 0.08 lb. of resin mix per square foot and about 0.035 lb. of resin mix per square foot. The woven fabric, when specifically glass cloth is used, will approximate about 10% of the total weight of the film.

The first component of the resinous mixture, identified in the claims as component "A" is a polyvinyl acetal-alcohol acetate resin. These resinous materials are available commercially and are described generally as polyvinyl acetal resins and, more precisely, as polyvinyl formal resins. This is in keeping with the description of the acetal, alcohol and acetate groups in the resin chain. The formal content expressed as a percent of the total polyvinyl formal molecules is preponderant whereas the hydroxyl content is expressed as percent polyvinyl alcohol, and the acetate content is expressed as percent polyvinyl acetate and is present in comparatively minor amounts. Illustrative of a particular species of these polyvinyl acetal resins is a commercially available resin having a molecular weight of between about 24,000 and 40,000 (weight average) having a hydroxyl content expressed as percent polyvinyl alcohol of 5.0–6.0 and an acetate content expressed as percent polyvinyl acetate of 9.5–13.0%, and a formal content expressed as polyvinyl formal approximating 82%. Other polyvinyl acetals may be used having a weight average molecular weight varying between about 16,000 and 44,000. The hydroxyl content varies over the range of between about 5.0% and 9.0%, the acetate content varies over a range of between about 9.5% and 50%, whereas the formal content varies over a range of about 50% to 82%, total percentages adding up to 100%. The product may be represented by the following stylized structure:

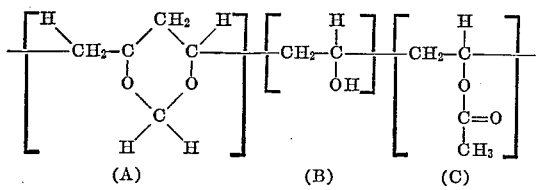

The proportions of (A), (B), and (C) are controlled and they are randomly distributed along the molecule.

The second component in the resinous mixture identified as component (B) is a commercially available polyglycol diepoxide having an epoxide equivalent weight varying between about 175 and 500. There are at least two commercially available polyglycol diepoxides which may be used in the composition of the present invention, one of which has an epoxide equivalent weight of between about 175–205 and has a viscosity at 25° C. of between about 30 and 60 centipoises. Another suitable commercially available material has an epoxide equivalent weight of between about 305–335 and has a viscosity at 25° C. of between about 55 and 100 centipoises.

The third component identified as (C) is a liquid polyhydric alcohol which is used in amounts varying between about 1% and 8%, by weight, and preferably from 2% to 5%, by weight, based on the total weight of (A) and (B) or on the total weight of (A), (B) and (E). When (A) and (B) are used without (E), the amount of (C) should be nearer the lower limit of the recited range, such as between about 2% and 5%, whereas when (E) is used with (A) and (B), one would preferably use about 5% to about 7%, by weight, based on the total weight of (A), (B) and (E). Among the polyhydric alcohols which may be used in the composition of the present invention are ethylene glycol, diethylene glycol, propylene glycol, dipropylene glycol, trimethylene glycol, tetramethylene gycol, glycerol, trimethylolpropane, trimethylolethane, pentaerythritol, dipentaerythritol and the like. These glycols and other polyhydric alcohols may be used either singly or in combination with one another, but whether used singly or in combination, the percentages recited hereinabove prevail.

The fourth component identified as (D) is 2-ethyl-4-methyl imidazole. This compound and the process of preparing the same is disclosed in the U.S. Patents 2,847,417 and 3,037,028.

An optional additive, and for certain applications preferably contained in a composition of the present invention, is any one of a series of chlorinated polyphenyls. These polyphenyls are also available commercially and may be substantially pure chlorinated biphenyls or blends of chlorinated biphenyls and triphenyls in varying proportions, or substantially pure chlorinated triphenyls. Some of these chlorinated biphenyls are colorless, mobile, oily liquids, others are mobile, oily liquids with yellowish or greenish coloration, while still others are solid resinous materials either as a white opaque resin or clear yellow to amber, brittle resin. The preferred species in this class of chlorinated polyphenyls is the substantially pure chlorinated biphenyl which is a white opaque resin.

When the resinous mixture is comprised of (A), (B) and (C) only, but catalyzed with (D), (A) may be present in an amount varying between about 40% to about 65%, by weight, based on the total weight of (A) and (B). Correspondingly, (B) is present in an amount varying between about 60% to about 35%, by weight, based on the total weight of (A) and (B) and (C) is present in an amount varying between 1% and 8% and, preferably, 2% and 5% based on the total weight of (A) and (B). When (E) is added to the resinous mixture, it is added in an amount varying between about 5% and 15%, by weight, based on the total weight of (A), (B) and (E), and preferably, 10%, by weight, same basis. Preferably, (A) and (B), when used without (E), are used in substantially equal amounts, namely, 50% of each of (A) and (B). Whether (A) and (B) are used alone or with (E), the amount of (D) is varied between about 2½% and 3½%, by weight, based on the total weight of (A) and (B) or (A), (B) and (E) and, preferably, 3% by weight, same basis. In all instances, the total weight of (A) and (B) or the total weight of (A), (B) and (E) in percentages, by weight, will total 100%.

In order that the concept of the present invention may be more completely understood, the following examples are set forth in which all parts are parts, by weight, unless otherwise indicated. These examples are set forth primarily for the purpose of illustration and any specific enumeration of detail set forth therein should not be interpreted as a limitation on the case except as is indicated in the appended claims.

EXAMPLE 1

Into a suitable mixing vessel there is introduced 280 parts of ethylene dichloride to which is added 50 parts, by weight, of a polyvinyl formal having a weight average molecular weight of between about 24,000 and 40,000, a hydroxyl content of about 5.0–6.0 expressed as percent polyvinyl alcohol, an acetate content expressed as percent polyvinyl acetate of 9.5–13.0 and a formal content expressed as percent polyvinyl formal approximating 82%. The contents are mixed for about 1½ hours at room temperature. Thereupon, there is added 50 parts of a polyglycol diepoxide having an epoxide equivalent weight of about 175–205 containing about 3 parts of dipropylene glycol. These materials are blended for about 15 minutes. It is sometimes desirable to add a coloring material such as a dye to the blend and, if such is accomplished, the total mixture is blended for an additional 15 minutes after the addition of the dye. The mixture is then held until ready for use whereupon 3 parts of the 2-ethyl-4-methyl imidazole is added and blended for an additional 15 minutes. The solution thus prepared is coated on a commercially available glass cloth using conventional coating and drying equipment. Coating speed is about 9.5″/min. and the coated cloth is dried at a temperature between about 120–140° F. for a period of about one hour. The dried tool qualification film is then ready to be used in a bonding assembly in order to test the effectiveness of the tool in making a "bonded" structure.

EXAMPLE 2

Example 1 is repeated in all essential details except that the polyvinyl acetal-alcohol-acetate resin is used in an amount of 40 parts and there is added additionally 10 parts of a substantially pure white opaque chlorinated biphenyl resin.

When the film prepared according to Example 1 is used to simulate a structural adhesive film, the curing is accomplished at temperatures of 325–350° F. When the film prepared according to Example 2 is utilized to simulate a structural adhesive film, the curing is accomplished at about 225–250° F.

I claim:

1. A tool qualification film comprising a woven fabric coated with a resinous mixture of:
    (A) from about 40% to about 65%, by weight, of polyvinyl acetal-alcohol-acetate resin, said polyvinyl acetal-alcohol-acetate resin having a weight average molecular weight of between about 16,000 and 44,000,
    (B) correspondingly from about 60% to about 35%, by weight, of a polyglycol diepoxide, said diepoxide having a diepoxide equivalent weight varying between about 175 and 500, (C) a liquid polyhydric alcohol in an amount varying between about 1% and 8%, by weight, based on the total weight of (A) and (B), and (D) from about 2½% to about 3½%, by weight, based on the total weight of (A) and (B) of 2-ethyl-4-methyl imidazole.

2. A tool qualification film as in claim 1 in which (A) and (B) are each present in an amount approximating 50%, by weight, based on the total weight of (A) and (B).

3. A tool qualification film as in claim 1 in which the amount of (D) present is about 3%, by weight, based on the total weight of (A) and (B).

4. The film according to claim 1 in which there is also present (E) from about 5% to about 15%, by weight, of a chlorinated polyphenyl wherein the total percentages of (A), (B) and (E) are 100%.

5. A film according to claim 1 in which:
(A) is present in an amount approximating 50%,
(B) is present in an amount approximating 40%, and
(E) is present in an amount approximating 10%, wherein
the percentages of (A), (B) and (E) total 100%.

6. The film according to claim 4 in which (D) is present in an amount approximating 3%, by weight, based on the total weight of (A), (B) and (E).

7. The film according to claim 5 in which (D) is present in an amount approximating 3%, by weight, based on the total weight of (A), (B) and (E).

References Cited

UNITED STATES PATENTS

| | | | |
|---|---|---|---|
| Re. 25,625 | 7/1964 | Been et al. | 260—837 X |
| 2,211,323 | 8/1940 | Fordyce | 117—161 X |
| 2,387,831 | 10/1945 | Cogan et al. | 117—161 |
| 2,713,567 | 7/1955 | Scheibli | 260—837 |
| 2,828,236 | 3/1958 | West | 161—186 X |
| 2,909,496 | 10/1959 | Cooke | 161—185 X |
| 3,018,267 | 1/1962 | Steckler et al. | 117—126 X |
| 3,058,951 | 10/1962 | Flowers et al. | 117—161 X |
| 3,097,963 | 7/1963 | Caroselli et al. | 117—126 |
| 3,255,214 | 6/1966 | Phillips et al. | 260—836 X |
| 3,255,215 | 6/1966 | Phillips et al. | 260—836 X |
| 3,329,652 | 7/1967 | Christie | 161—185 X |

FOREIGN PATENTS

| | | |
|---|---|---|
| 584,932 | 10/1959 | Canada. |
| 671,506 | 10/1963 | Canada. |

WILLIAM D. MARTIN, *Primary Examiner.*

MATHEW R. P. PERRONE, JR., *Assistant Examiner.*

U.S. Cl. X.R.

117—126; 161—93, 185; 260—836, 837